A. E. DE SAVE.
OIL TANK.
APPLICATION FILED MAR. 22, 1918.
1,393,719. Patented Oct. 11, 1921.
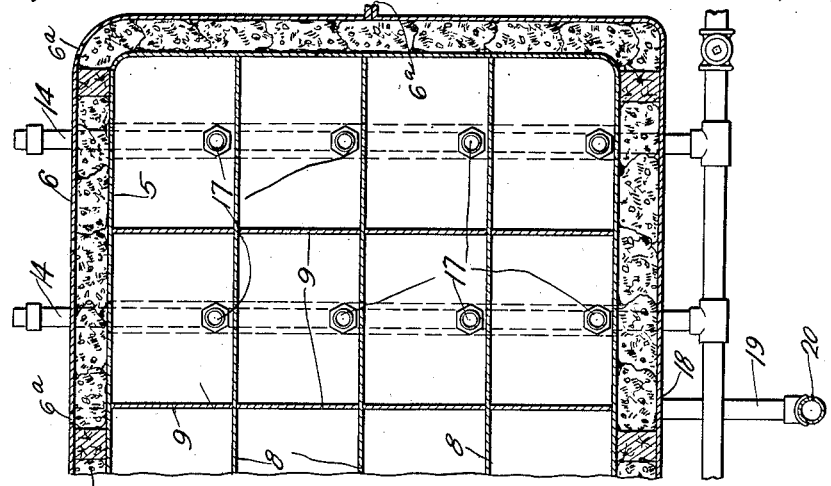
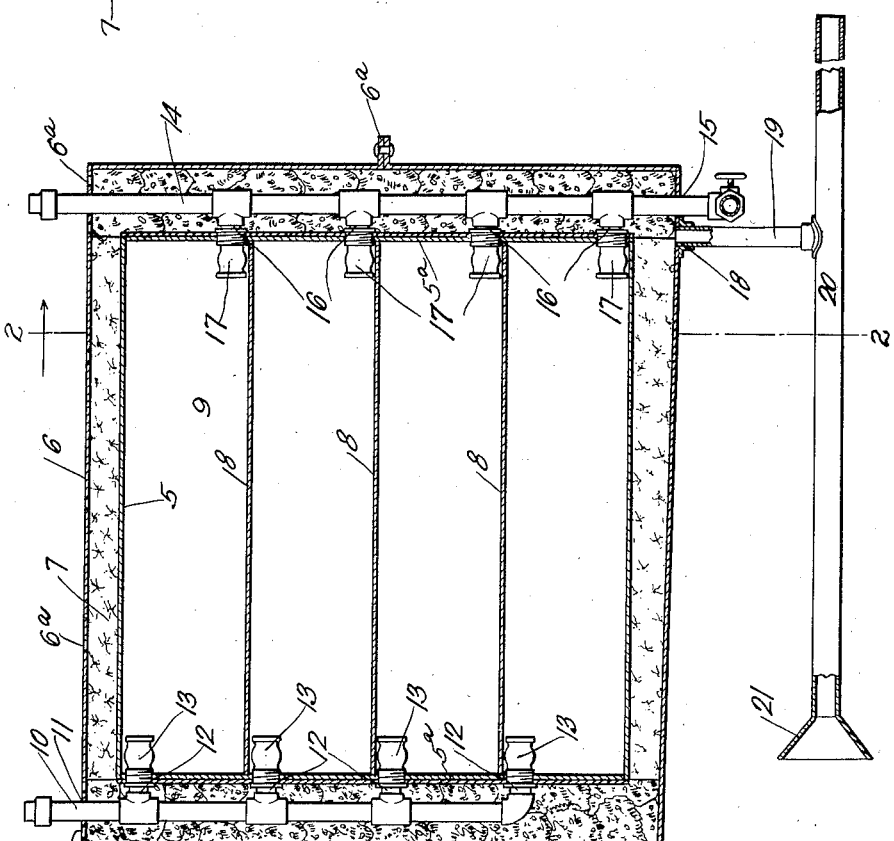
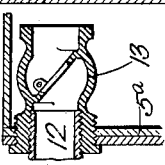
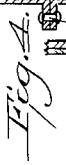
WITNESSES
Oliver H. Holmes
E. B. Marshall
INVENTOR
A. E. De Save
BY Munn & Co
ATTORNEYS

UNITED STATES PATENT OFFICE.

ARTHUR ERNEST DE SAVE, OF MOBILE, ALABAMA.

OIL-TANK.

1,393,719.　　　Specification of Letters Patent.　　Patented Oct. 11, 1921.

Application filed March 22, 1918. Serial No. 223,962.

*To all whom it may concern:*

Be it known that I, ARTHUR E. DE SAVE, a subject of Great Britain and Ireland, resident of Mobile, Mobile county, Alabama, have invented a new and Improved Oil-Tank, of which the following is a full, clear, and exact description.

My invention has for its object to provide a tank for gasolene which is especially valuable for use on aeroplanes. The tank is constructed with an inner and an outer casing, the latter having an outlet at its bottom connected with a longitudinal tube, so that should be tank be penetrated by a bullet, the gasolene will be prevented from spurting therefrom by an elastic, absorbent material packed between the casings, and the gasolene will leak slowly between the casings and will find its way to the longitudinally extending tube which is open at both ends and which will serve to discharge the gasolene at the rear of the aeroplane.

Another object of the invention is to divide the inner casing into a plurality of compartments and connect an inlet pipe with each compartment and each compartment with an outlet pipe.

Additional objects of the invention will appear in the following specification in which the preferred form of my invention is described.

In the drawings, similar reference characters refer to similar parts in all the views, in which—

Figure 1 is a sectional side elevation of the invention;

Fig. 2 is a sectional view on the line 2—2 of Fig. 1;

Fig. 3 is an enlarged sectional fragmentary view illustrating the check valve at one of the inlet branches to a compartment; and Fig. 4 is an enlarged sectional fragmentary view illustrating one of the check valves at a branch leading from one of the compartments to the outlet.

By referring to the drawings, it will be seen that the tank is provided with an inner casing 5 and an outer casing 6, the inner casing 5 being spaced from the outer casing 6 and the space between the casings being packed with an elastic, absorbent material such as sponge 7. The outer casing 6 is preferably in two sections having flanges bolted together at 6ª.

The inner casing 5 is divided by horizontal partitions 8 and by vertical partitions 9 into a plurality of compartments, there being an inlet pipe 10 which extends through an opening 11 in the outer casing 6 and which is provided with a plurality of branches 12 which lead one to each of the compartments; there being a check valve 13 in each of the inlet branches 12 which permits the gasolene or other fluid to flow into the compartments but which prevents a return flow of the fluid. The sides of the inner casing 6 are provided with stiffening plates 5ª.

There is also an outlet pipe 14 which is disposed between the inner casing 5 and the outer casing 6 and which extends through the outer casing 6 through an opening 15. The compartments are connected with this outlet pipe 14 by means of outlet branches 16; these branches 16 being provided with check valves 17 which prevent the flow of a fluid from the outlet pipe 14 to the compartments while permitting the gasolene or other fluid to flow from the compartments to the outlet pipe.

It will be seen that this construction, should one of the compartments be penetrated by a bullet, that while the gasolene or other fluid will leak from the compartments through the bullet hole, the fluid contained in the other compartments will not flow to the compartment which has been penetrated. By this means the leakage will be reduced to a minimum.

Connected with the bottom of the outer casing 6, at an opening 18 therein, there is an outlet pipe 19 which is connected with a longitudinally extending pipe 20 open at both ends and having an enlarged inlet 21 at its forward end. Should the tank be penetrated by a bullet, the gasolene leaking from one or more of the compartments will be prevented from spurting from the tank by the elastic, absorbent material 7. The gasolene will, therefore, flow into the absorbent material between the casings from which it is drawn swiftly by the suction in the pipe 19 caused by the rush of air through the pipe 20 which discharges the gasolene at a safe distance from the machine. There are small holes 6ᵇ in the top of the outer casing which permit a free circulation of air through the absorbent material 7.

Having thus described my invention, I claim as new and desire to secure by Letters Patent:

1. In a gasolene tank, an inner casing, an outer casing inclosing the inner casing and spaced therefrom, an absorbent material packed in the space between the two casings, the inner casing being divided by horizontal and vertical partitions into a plurality of compartments, inlets, branches connecting the inlets with the compartments, check valves in the branches, outlets, branches connecting the compartments with the outlets, check valves in the last mentioned branches, an outlet at the bottom of the outer casing, and a longitudinally extending tube without the outer casing and open at both ends the last mentioned outlet communicating with the tube intermediate its ends.

2. In a gasolene tank, an inner casing, an outer casing inclosing the inner casing and spaced therefrom, an elastic material packed in the space between the two casings, an inlet and an outlet for the inner casing, and an outlet at the bottom of the outer casing.

3. In a gasolene tank, an inner casing, an outer casing inclosing the inner casing and spaced therefrom, an elastic material packed in the space between the casings, an inlet and an outlet for the inner casing, an outlet at the bottom of the outer casing, and a longitudinally extending tube without the outer casing and open at both ends, the last mentioned outlet communicating with the tube intermediate its ends.

4. In a tank, an inner casing, an outer casing inclosing the inner casing and spaced therefrom, the inner casing being divided into a plurality of compartments, an absorbent material packed in the space between the two casings, an inlet, branches connecting the inlet with each of the compartments, an outlet, branches connecting the compartments with the outlet, and an outlet at the bottom of the outer casing.

5. In a tank, an inner casing, an outer casing inclosing the inner casing and spaced therefrom, the inner casing being divided into a plurality of compartments, an elastic material packed in the space between the two casings, an inlet, branches connecting the inlet with each of the compartments, an outlet, branches connecting the compartments with the outlet, an outlet at the bottom of the outer casing, and a longitudinally extending tube open at both ends, the last mentioned outlet communicating with the said tube intermediate of its ends.

6. In a tank, an outer casing, an inner casing divided into a plurality of compartments and disposed in a space from the first casing, an absorbent material packed between the casings, an inlet, branches connecting the inlet with each of the compartments, an outlet, branches connecting the compartments with the outlet check valves in the branches, and an outlet at the bottom of the outer casing.

7. In a tank, an inner casing, an outer casing inclosing the inner casing and spaced therefrom, the inner casing being divided into a plurality of compartments, an absorbent material packed between the casings, a vertical inlet in the space between the inner and outer casing and disposed in the absorbent material, branches connecting the inlet with each of the compartments, a vertical outlet in the space between the inner and outer casing and disposed in the absorbent material, branches connecting the compartments with the outlet, check valves in the branches, and an outlet at the bottom of the outer casing.

8. In a tank, an inner casing, an outer casing inclosing the inner casing and spaced therefrom, the inner casing being divided into a plurality of compartments, an absorbent material packed between the casings, a vertical inlet in the space between the inner and outer casings and disposed in the absorbent material, branches connecting the inlet with each of the compartments, a vertical outlet in the space between the inner and outer casings and disposed in the absorbent material, branches connecting the compartments with the outlet, check valves in the branches, an outlet at the bottom of the outer casing, and a longitudinally extending tube open at both ends, the last mentioned outlet communicating with the tube intermediate of its ends.

9. In an oil tank adapted to be carried on a moving body, an outer inclosing casing having sides, a top and a bottom, an inner casing disposed in and spaced from the first casing, an outlet for the outer casing and a tube open at both ends at the outer side of the outer casing, the tube extending in the direction of movement of the body and the outlet communicating with the tube intermediate its ends.

10. In an oil tank adapted to be carried on an aeroplane, an outer inclosing casing having sides, a top and a bottom, an inner inclosing casing having sides, a top and a bottom, the inner inclosing casing being disposed in and spaced from the first casing, an outlet for the outer casing, and a tube open at both ends disposed at the outer side of the outer casing, the tube extending in the direction of movement, and the outlet communicating with the tube intermediate its ends.

ARTHUR ERNEST DE SAVE.